US010770932B2

(12) United States Patent
Pantic et al.

(10) Patent No.: US 10,770,932 B2
(45) Date of Patent: Sep. 8, 2020

(54) MAGNETIZABLE CONCRETE COMPOSITE FOR ROAD-EMBEDDED WIRELESS POWER TRANSFER

(71) Applicants: Utah State University, North Logan, UT (US); Zeljko Pantic, North Logan, UT (US); Marc Maquire, North Logan, UT (US); Reza Tavakoli, North Logan, UT (US)

(72) Inventors: Zeljko Pantic, North Logan, UT (US); Marc Maquire, North Logan, UT (US); Reza Tavakoli, North Logan, UT (US)

(73) Assignee: Utah State University, Logan, UT (US)

( * ) Notice: Subject to any disclaimer, the term of this patent is extended or adjusted under 35 U.S.C. 154(b) by 82 days.

(21) Appl. No.: 16/232,899

(22) Filed: Dec. 26, 2018

(65) Prior Publication Data

US 2019/0245393 A1  Aug. 8, 2019

Related U.S. Application Data

(63) Continuation-in-part of application No. 16/149,052, filed on Oct. 1, 2018, now abandoned.
(Continued)

(51) Int. Cl.
*H02J 50/90* (2016.01)
*C04B 14/36* (2006.01)
(Continued)

(52) U.S. Cl.
CPC ............ *H02J 50/90* (2016.02); *C04B 14/363* (2013.01); *C04B 20/0012* (2013.01);
(Continued)

(58) Field of Classification Search
CPC .. H02J 50/90; H02J 50/10; H02J 5/005; H02J 7/022; C04B 14/363; C04B 20/0012;
(Continued)

(56) References Cited

U.S. PATENT DOCUMENTS

2002/0055009 A1    5/2002  Esguerra
2019/0308216 A1 * 10/2019  Perez Romero ...... H01F 27/365

FOREIGN PATENT DOCUMENTS

WO        2017060387 A1    4/2017

OTHER PUBLICATIONS

Tavakoli; "Magnetizable concrete composite materials for road-embedded wireless power transfer pads"; 2017 IEEE Energy Conversion Congress and Exposition (ECCE); Oct. 2017; pp. 4041-4048.
(Continued)

*Primary Examiner* — Carlos Amaya

(57) ABSTRACT

A magnetizable concrete wireless power transfer pad can include a base, an inductive coil and a pillar. The base can comprise a magnetizable base concrete including concrete and first magnetizable particles, the first magnetizable particles having a magnetic permeability and a magnetic saturation. The inductive coil can be positioned directly adjacent and centered over the base, the inductive coil forming an inductive coil gap at its center inner perimeter between a conductive wire that form the inductive coil, the inductive coil having an outer perimeter, a lateral width, and a longitudinal length. The pillar can extend up from the base through the inductive coil gap, the pillar comprising a magnetizable pillar concrete including concrete and second magnetizable particles, the second magnetizable particles having a magnetic permeability and a magnetic saturation such that the base and the pillar collectively shape an external magnetic field produced by the inductive coil to
(Continued)

increase the mutual coupling with a receiver pad, that way increasing the power transfer capabilities of the system.

25 Claims, 12 Drawing Sheets

Related U.S. Application Data

(60) Provisional application No. 62/565,774, filed on Sep. 29, 2017.

(51) Int. Cl.
*H02J 50/10* (2016.01)
*H02J 5/00* (2016.01)
*C04B 20/00* (2006.01)
*H02J 7/02* (2016.01)
*C04B 28/04* (2006.01)
*E01C 9/00* (2006.01)
*C04B 7/02* (2006.01)
*C04B 111/00* (2006.01)
*C04B 111/94* (2006.01)

(52) U.S. Cl.
CPC .......... *C04B 20/0036* (2013.01); *C04B 28/04* (2013.01); *E01C 9/00* (2013.01); *H02J 5/005* (2013.01); *H02J 7/022* (2013.01); *H02J 50/10* (2016.02); *C04B 7/02* (2013.01); *C04B 2111/0075* (2013.01); *C04B 2111/00422* (2013.01); *C04B 2111/94* (2013.01)

(58) Field of Classification Search
CPC . C04B 28/04; C04B 7/02; C04B 2111/00422; C04B 2111/0075; C04B 2111/94; E01C 9/00
See application file for complete search history.

(56) References Cited

OTHER PUBLICATIONS

Stabik; "Magnetic properties of polymer matrix composites filled with ferrite powders"; International Scientific Journal; Apr. 2011; vol. 48; Issue 2; pp. 97-102; World Academy of Materials and Manufacturing Engineering.

Anhalt; "Magnetic properties of polymer bonded soft magnetic particles for various filler fractions"; Journal of Applied Physics; vol. 101; Issue 2; 2007.

Slama; "Magnetic powder filled polymers"; IEEE Transactions on Magnetics; vol. 30; No. 2; Mar. 1994.

Koledintseva; "Engineering, modeling and testing of composite absorbing materials for EMC applications"; Advances in Composites Materials—Ecodesign and Analysis; Mar. 2011.

Lucke; "Magnetizabe concrete—a composite material containing ferrite ceramics"; Materials Science & Technology Technical Meeting and Exhibition 2016; Oct. 23, 2016; Salt Lake City, UT, USA.

Fiske et al.; "Effects of Flow Induced Orientation of Ferromagnetic Particles on Relative Magnetic Permeability of Injection Molded Composites." Polymer Engineering and Science; Wiley Online Library; vol. 37, Issue 5; Published May 1997; pp. 826-837.

* cited by examiner

MAGNETIZABLE CONCRETE COMPOSITE FOR ROAD-EMBEDDED WIRELESS POWER TRANSFER

RELATED APPLICATION

This application is a continuation-in-part of U.S. patent application Ser. No. 16/149,052, filed Oct. 1, 2018 which claims the benefit of U.S. Provisional Application No. 62/565,774, filed Sep. 29, 2017, which is incorporated here by reference.

BACKGROUND

Cementitious composites are the most widely used engineered building material and the second most used material in general. Development of multifunctional, sustainable, economical, or more durable structures would have a significant impact on human health and the environment, preserve natural resources, and save energy. Recently, there is significant motivation to integrate electromagnetic functions in structural materials, resulting in structural supercapacitors, structural batteries, and structural fuel cells, where mechanical strength is improved by materials such as carbon nanotubes, carbon fibers, graphite, etc. The multifunctional operation of these devices saves space and reduces cost. However, little effort has been made to integrate magnetic materials into strong nonmagnetic structures.

Cementitious magnetic composites (CMC) are intended for applications such as magnetic shielding of structures and buildings, energy storage, or emerging applications of wireless charging of electric vehicles from ground-embedded charging units. For example, electrical energy may be transmitted wirelessly to an electric vehicle from a wireless power transfer pad. Unfortunately, challenges remain in balancing performance of CMC materials with costs and mechanical strength.

SUMMARY

A magnetizable concrete wireless power transfer pad can be integrated into a road structure and made of materials that are very similar to the road structure. The magnetizable concrete wireless power transfer pad can be configurable to produce a consistent and sufficient mutual coupling with the receiver pad to be capable of charging a stationary or moveable receiver. The present disclosure in aspects and embodiments addresses these various needs and problems.

In one example, a magnetizable concrete wireless power transfer pad can include a base, an inductive coil, and a pillar. The base can be formed of a magnetizable base concrete including concrete and first magnetizable particles, the first magnetizable particles having a magnetic permeability and a magnetic saturation. The inductive coil can be positioned directly adjacent and centered over the base. The inductive coil forms an inductive coil gap at its center inner perimeter between a conductive wire that form the inductive coil, the inductive coil having an outer perimeter, a lateral width, and a longitudinal length. The pillar extends up from the base through the inductive coil gap. Furthermore, the pillar comprises a magnetizable pillar concrete including concrete and second magnetizable particles, where the second magnetizable particles have a magnetic permeability and a magnetic saturation such that the base and the pillar collectively shape an external magnetic field produced by the inductive coil to reduce leakage field and increase coupling with the receiver coil which leads to higher power transfer capability of the system.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

Figure 1:
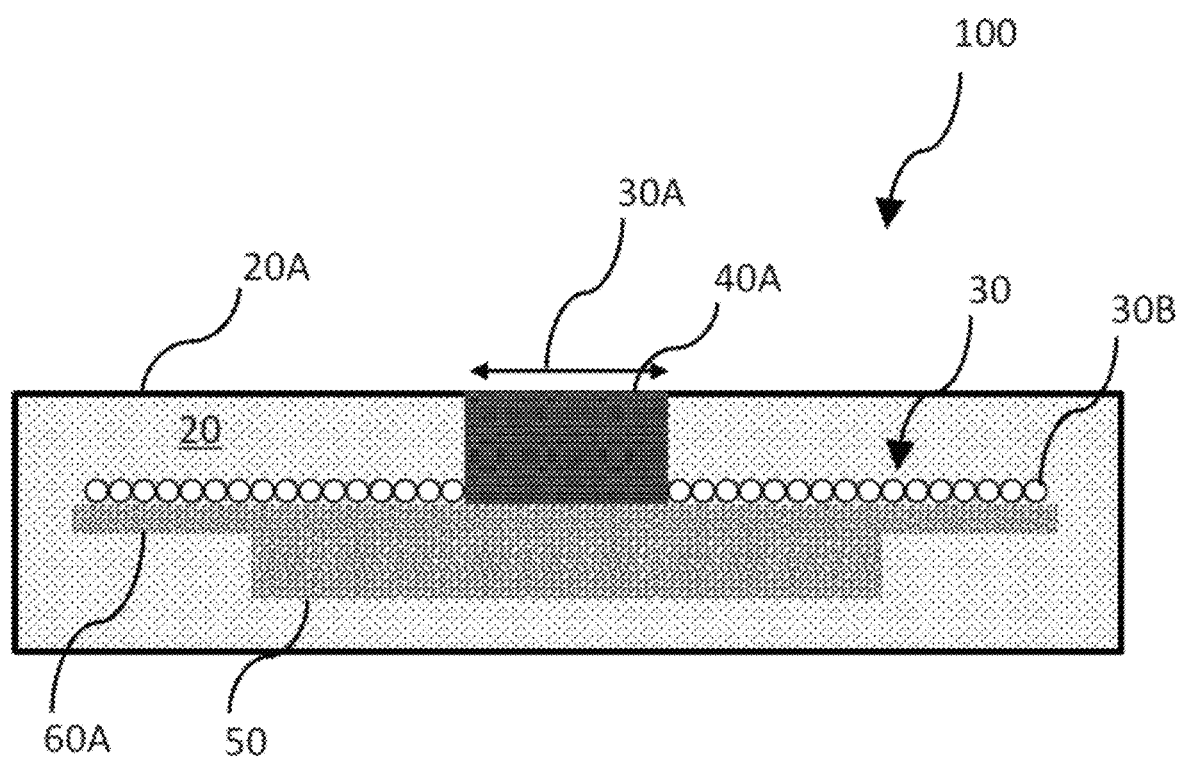
FIG. 1 is a cross-sectional view of a magnetizable concrete wireless power transfer pad, in accordance with an example.

These drawings are provided to illustrate various aspects of the invention and are not intended to be limiting of the scope in terms of dimensions, materials, configurations, arrangements or proportions unless otherwise limited by the claims.

Reference will now be made to the exemplary embodiments illustrated, and specific language will be used herein to describe the same. It will nevertheless be understood that no limitation of the scope of the technology or disclosure is thereby intended.

DETAILED DESCRIPTION

Before the present disclosure is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

The present disclosure covers apparatuses and associated methods for a magnetizable concrete wireless power transfer pad. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In describing and claiming the present invention, the following terminology will be used.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional", "optionally" or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

FIG. 1 illustrates a cross-sectional view of a magnetizable concrete wireless power transfer pad 100. In some embodiments, a magnetizable concrete wireless power transfer pad includes a sub-base 50, a base 60A positioned directly above the sub-base 50, and an inductive coil 30 positioned directly above and centered over the base 60A. The inductive coil 30 typically forms a central gap 30A at its center between conductive wires that form the inductive coil.

The sub-base 50 and base 60A are made of magnetizable concrete containing up to 75% by volume magnetic particles, and in some cases also greater than 10%. A concentration above 10% and below 75% provided sufficient magnetic permeability needed for field shaping while at the same time provides sufficient mechanical strength to a concrete pad such as those used in road applications.

In one example, the sub-base can have a planar area which is smaller than a planar area of the base. In some cases, the sub-base planar area can be at least 20% less, 30% less, and in some cases at least 50% less than the base planar area. The sub-base can generally be narrower than the base in order to reduce the amount of magnetic particles used for mixing and reduce cost. The magnetic field is not uniform and is stronger closer to the coils and closer to a vertical axis of the pad. Therefore, the sub-base can be narrower since closer to the lateral sides, the field density is lower, such that there is less benefit of inserting the particles. Similarly, the sub-base and base can have varied thicknesses. In one example, a thickness of the sub-base can be greater than a thickness of the base, and in some cases from about 20% to about 300% greater. Furthermore, the wireless power transfer pad can optionally have a single pad and sub-pad assembly for a single induction coil. In some alternatives, multiple coils and/or multiple sub-bases and bases can be used to provide extended pad lengths and shapes.

In one example, the base can comprise a magnetizable base concrete including a concrete and a plurality of one or more magnetizable or magnetic particles. The magnetizable particles can be chosen to have a magnetic permeability and a magnetic saturation that can be predefined or calculated based on one or more properties or power transfer operations.

The magnetic particles can be soft ferrites, pure iron and its alloys, iron-oxides (e.g. magnetite), or the like. Soft ferrites can include any number of magnetic iron oxide ceramic materials which include supplemental metallic elements (e.g. manganese, nickel, barium, zinc, etc). Most often the ferrites can include, but are not limited to, manganese-zinc and nickel-zinc. In one specific example, magnetic particles can be magnetite. In another example, magnetic particles can be manganese-zinc ferrite or nickel-zinc ferrite. As one example, the magnetic particles can be a soft ferromagnetic material. Soft ferromagnetic materials tend to have high permeability and but very small coercivity (e.g. less than 100 Oe and often less than 10 Oe), such that these materials also have very narrow hysteresis loops, resulting in low hysteresis loss when exposed to an alternating magnetic field. As a general rule, these magnetizable particles can be used as additives in a concrete as magnetic field shaping particles and/or as magnetic field shielding particles. Field shaping particles can generally have a high intrinsic magnetic permeability of greater than 100, and in some cases greater than 1000. For proper operation, the equivalent relative permeability of the magnetic composite made by using these particles can be greater than 5 and in some cases greater than 10, or even greater than 15. Similarly, field shielding particles can be capable of dissipating power inside which is possible if they have, apart from good magnetic properties, good conductivity, as well, typically higher than 100 S/cm.

Furthermore, magnetic particles can generally have an asymmetric shape (e.g. non-spherical). In some examples, the magnetic particles can have an aspect ratio of greater than about 1.2, in some cases greater than 2, and in other cases up to 20. In other embodiments, the field shaping particles are in the form of oblate-shaped flakes or prolate-shaped particles (e.g. rod-shaped). In one example, ferrite in the form of oblate-shaped flakes can provide greater magnetic permeability than ferrite powder or rod-shaped ferrite particles. Similarly, magnetic particles can vary in size but are generally greater than about 1 mm in length, and in some cases greater than 3 mm in length, up to about 2 cm and in some cases up to about 1 cm in length.

The magnetizable concrete wireless power transfer pad also includes a pillar 40A extending up from the base 60A through the central gap 30A. Additionally, the pillar 40A is made of magnetizable concrete containing up to about 75% by volume. Magnetic field shaping particles provide a strong magnetic permeability that is advantageous in directing magnetic fields from the transmitting inductive coil to a receiving inductive coil. In one example, magnetite can be used as magnetic particles in the sub-base and/or shielding blocks, while ferrite can be used as magnetic particles in the pillar and base. Magnetic field density at the pillar position is the highest. Therefore, the composite material for the pillar can have the highest volumetric density among all composite parts, resulting in the highest equivalent relative permeability of the pillar composite. Since the pillar only shapes the field and it does not have a shielding role, it can be made of relatively low conductive magnetic particles (e.g. Mn—Zn soft ferrite).

As a general guideline, the base can comprise magnetizable concrete containing less than 75% by volume and greater than about 10% by volume magnetic particles. In many cases, from 20% to 50% by volume magnetic particles can be used. A concentration less than 75% can most often still provide sufficient magnetic permeability ($\mu_e$'), ensure sufficient strength (e.g. compressive strength $f_c$'), and reduce the cost of the magnetizable concrete wireless power transfer pad.

Concrete can form a base matrix portion of each of the base, sub-base, pillar and surrounding support pad structure. Concrete is generally a mixture of cement and solid aggregate (e.g. rock). Any suitable concrete can be used such as, but not limited to, Portland cement based concrete, high strength concrete (e.g. silica reinforced), high performance concrete, ultra high-performance concrete, self-consolidating concrete, pervious concrete, polymer concrete, lightweight concrete, asphalt concrete, shotcrete, limecrete, and the like.

Figure 2:
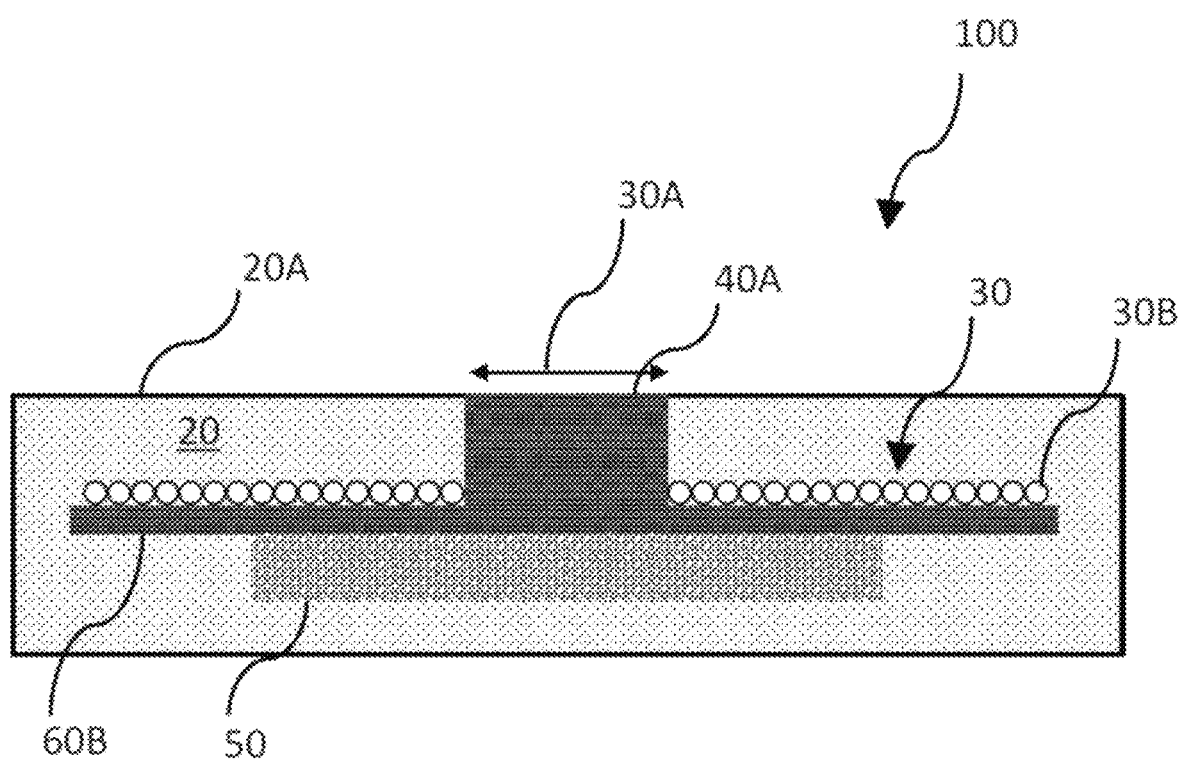
FIG. 2 is a cross-sectional view of another magnetizable concrete wireless power transfer pad, in accordance with an example.

Similarly to FIG. 1, FIG. 2 illustrates another magnetizable concrete wireless power transfer pad 100, in an example of which is similar in many respects to those described above, and which descriptions are hereby incorporated by reference. In some embodiments, a magnetizable concrete wireless power transfer pad includes a sub-base 50, a base 60B, made of a different combination of magnetizable material, positioned directly above the sub-base 50, and an inductive coil 30 positioned directly above and centered over the base 60B. The inductive coil 30 typically forms a central gap 30A at its center between conductive wires that form the inductive coil.

The sub-base 50 and base 60B are made of magnetizable concrete containing up to 75% by volume magnetic particles, and in some cases also greater than 10%. A concentration above 10% and below 75% provided sufficient magnetic permeability needed for field shaping while at the same time provides sufficient strength to a concrete pad that might be placed in a road. Often, multiple wireless power transfer pads can be spatially distributed along a road surface.

Figure 3:
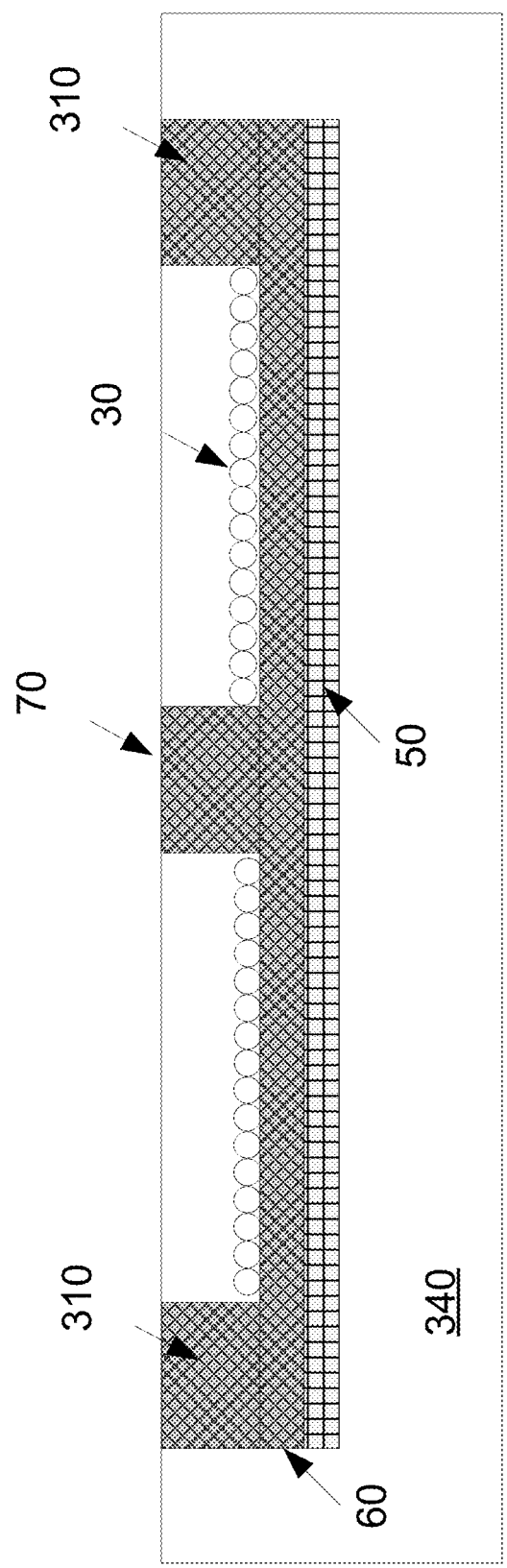
FIG. 3 is a cross-sectional view of a pad structure of lateral blocks of composite including additional field-shaping elements, in accordance with an example.

In another embodiment, FIG. 3 illustrates a pad structure of lateral blocks 310 of composite as a secondary shaping pillar or element, in an example of which is similar in many respects to those described above, and which descriptions are hereby incorporated by reference. In some embodiments, a magnetizable concrete wireless power transfer pad includes a sub-base 50, a base 60 positioned directly above the sub-base 50, an inductive coil 30 positioned directly above and centered over the base 60 and a magnetizable concrete surrounding the pad structure. In one example the sub-base can be oriented adjacent to the base opposite the pillar. Lateral blocks can be positioned above the base and sub-base. The lateral blocks 310 can be constructed of magnetic composite and can be structured to be directly above the sub base on both ends. Further, the lateral blocks can be oriented along at least lateral peripheral edges of the inductive coil 30. In some cases, the lateral blocks can also extend along transverse peripheral edges of the inductive coil as well (e.g. on pads at ends of a charging roadway segment). The structure of the lateral blocks can be configured for better shaping and directing the magnetic field towards a receiving object about the magnetizable concrete wireless power transfer pad. More specifically, the lateral blocks can be configured to increase or maximize power transfer from the inductive coil to a corresponding receiving coil on passing vehicles, for example. The lateral blocks 310 can further be structured to be equal distant from the central pillar, or at varied positions that are found suitable for necessary shaping and inductive property of the magnetic field. The position and size of blocks 310 depends on the size of the receiver pad. For the typical case when the receiver pad is narrower than the transmitter pad, 310 blocks can be located just next to the outer coil turn. In the case of a charging roadway segment, the lateral blocks can be generally oriented apart from one another a width of standard wheel separation distances or slightly greater than such distance (e.g. 5-7 feet). The magnetic composite of the lateral blocks can most often be made of ferrite material, and of the same structure and volumetric density as the central pillar, although other field shaping magnetic particles can be used as previously described. The volumetric density of field shaping magnetic particles within the composite can generally be higher in the pillar and lateral blocks than the base (Vf,2>Vf,1), resulting in equivalent relative magnetic permeability of the composite being greater in the pillar and lateral blocks than in the base portion (μr,2>μr,1). The subbase 50, additionally can comprise of a similar composite material as the base 60 and lateral blocks 310. However, the volumetric density of ferrite (or other field shaping magnetic material) within the subbase is in general lower than in the base. This is justified by the fact that in the zone of sub-base, the magnetic field density in is lower, and volumetric density of the magnetic particles is reduced accordingly in order to reduce the amount of magnetic particles used. In some cases, the sub-base can include shielding particles rather than shaping particles as discussed previously.

The inductive coil 30 can be positioned directly adjacent and centered over the base. The inductive coil can form an inductive coil gap at its center inner perimeter between one or more conductive wires that forms the inductive coil, wherein the inductive coil can have an outer perimeter, a lateral width, and a longitudinal length.

The inductive coil 30 can be formed of any suitable conductive material. The inductive coil can be a conductive cable which can be a single solid wire or a multi-strand wire cable (Litz wire). As a general guideline, the conductive coil can be formed of cable having an effective gauge size from 2 to 20, and most often 4 to 12. The conductive coil can have a thickness less than a height of the central pillar and generally less than about 30% of the pillar height. In some cases, the thickness of the layer of the concrete above the coil can be at least 5 cm. Furthermore, the inductive coil can be formed as a single layer planar coil (i.e. each coil pass within a common plane), although coil passes can be multi-layered. The inductive coil can also have an insulation or coating which protects the conductive wire from corrosion or adverse interaction with surrounding concrete, particularly during the wet concrete phase.

Figure 4:
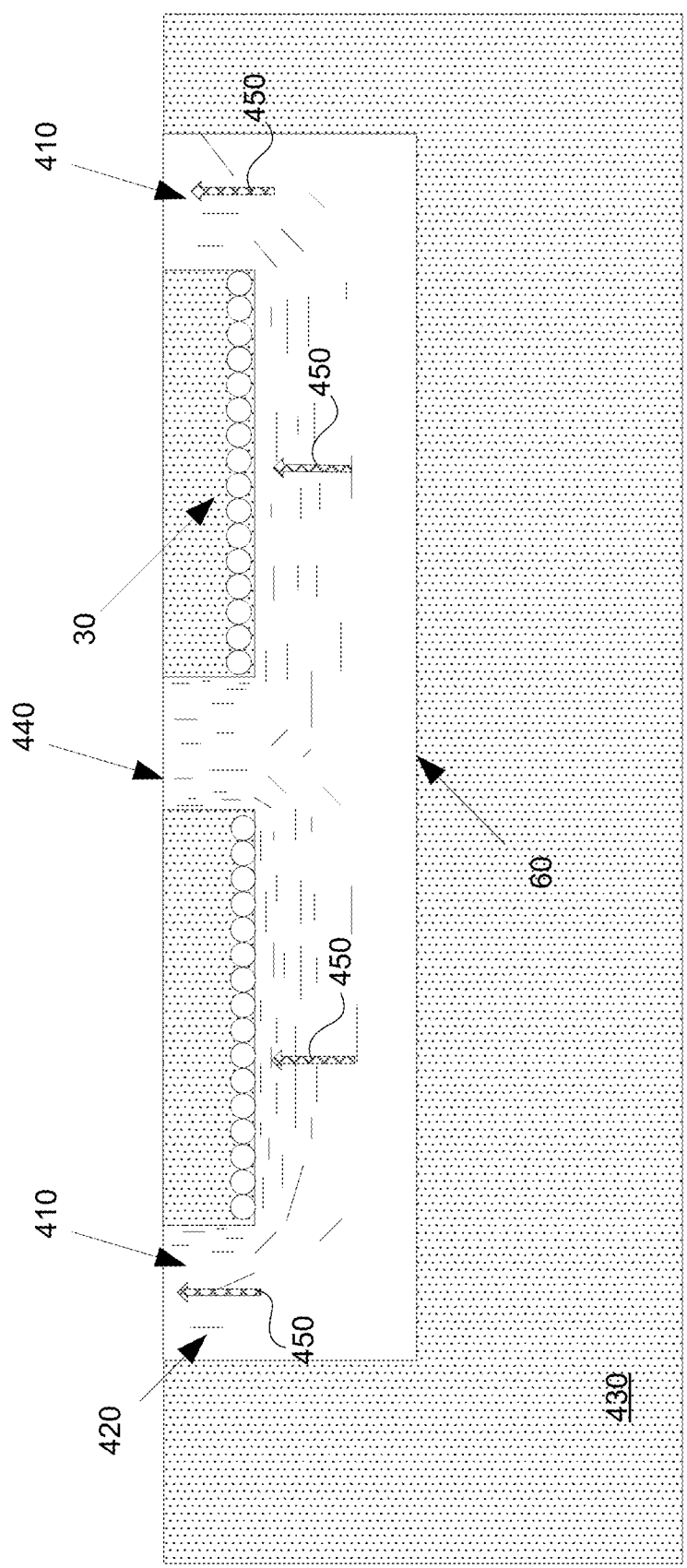
FIG. 4 is an illustration of a pad structure with a non-uniform concentration of magnetizable material, in accordance with an example.

Still in other embodiments, the magnetic particles 420 in the magnetizable concrete portion (including pillar 440, lateral blocks 410, and base 60) has a non-uniform distribution with a highest concentration of magnetic particles 420 being closest to a surface facing the inductive coil 30 and facing the surface of the road, as illustrated in FIG. 4, in an example of which is similar in many respects to those described above, and which descriptions are hereby incorporated by reference. Arrows 450 show magnetic particle concentration gradients and point in a direction of increasing concentration. In one embodiment, higher concentrations of magnetic particles 420 can provide a greater magnetic permeability. In such cases, a gradient in concentration of magnetic particles can be formed throughout the magnetizable concrete portion. As a general guideline concentrations can vary by about 5% to about 50% depending on the desired operating field distribution and the pad dimensions. Additionally, a higher particle orientation and/or concentration could be in line with the magnetic field to increase inductance and power. For example, high-aspect ratio magnetic particles can be aligned with a corresponding magnetic field produced by the inductive coil. In some cases the magnetic particles can be greater than 80% aligned, while in other cases greater than about 90% aligned, and in some cases greater than 95% aligned. In the context of this configuration, field alignment occurs when a particle long axis is oriented within +/−5° of a magnetic field line produced by the inductive coil. Thus, in some cases the magnetic particles can have an orientation index of greater than 0.85, or greater than 0.90, and in some cases greater than 0.95. Orientation index is a known property as described by Fiske et al., "Effects of flow induced orientation of ferromagnetic particles on relative magnetic permeability of injection molded composites," *Polymer Engineering & Science* 37, no. 5 (1997), pp. 826-837. In one example, a non-uniform distribution of magnetic particles 420 can provide higher magnetic permeability where it is needed most, in this case closest to the inductive coil.

In one embodiment, the base 60 can comprise of a magnetizable base concrete including concrete and a first magnetizable particles. The first magnetizable field shaping particles can have a magnetic permeability and a magnetic saturation that can be predefined or determined from one or more properties or power transfer operations. In some embodiments, the base can be planar and/or extend beyond the outer perimeter of the inductive coil.

Similarly, the ferrite in the magnetizable concrete of the pillar 440 can have a non-uniform distribution with the highest concentration of ferrite being closest to surfaces facing the inductive coil 30. A non-uniform distribution of ferrite can provide higher magnetic permeability where it is needed most, in this case closest to the inductive coil 30.

The pillar 440 (70 in FIG. 3) can extend up from the base of through the inductive coil gap. The pillar 70 can comprise a magnetizable pillar concrete 340, including concrete 340 and second magnetizable particles. The second field shaping magnetizable particles can have a magnetic permeability and a magnetic saturation such that the base and the pillar collectively can shape an external magnetic field produced by the inductive coil to reduce the field leakage and to increase the mutual coupling between the transmitter inductive coil and the receiver inductive coils. This design allows direction of the magnetic field line around the turns and up so that the most of the field lines are directed toward the receiver coil, rather than being dispersed in a lateral direction.

In one embodiment the first magnetic particles in the magnetizable base concrete can have a non-uniform distribution with a highest concentration of magnetic particles being closest to a surface facing the inductive coil. In another example, the second magnetic particles in the magnetizable pillar concrete can have a non-uniform distribution with a highest concentration of magnetic particles being closest to surfaces facing the inductive coil and the road surface. Additionally, the first and second magnetic particles can be oriented along magnetic field lines of the inductive coil.

In one embodiment the wireless power transfer pad system can comprise a shielding element positioned around a lateral perimeter of the base and sub base, or one or more portions of the base and the sub base. In one example, the shielding can comprise a concrete and one or more third magnetizable particles chosen so as to reduce or eliminate the external magnetic field beyond an outer edge of the shielding element. The composite made of third magnetizable particles can have an equivalent magnetic permeability that is lower than in the composite made of the first magnetizable particles (and most often even the second magnetizable particles), and electric conductivity significantly higher than in the first and the second magnetizable particles. As a general guideline, the third magnetic shielding particles can have an intrinsic relative magnetic permeability greater than about 50, and in some cases greater than 500, while the equivalent relative permeability of the composite made using them can be greater than 3. The conductivity of the particles used can also be in the range or greater than 100 S/m. Although other materials can be used, the magnetic shielding particles can often be magnetite.

In one embodiment, the wireless power transfer pad system can comprise a magnetizable concrete where the base concrete contains 10% to 75% by volume of the first magnetizable particles. In another embodiment the sub-base and base can comprise of magnetizable concrete containing between 10% and 75% by volume magnetite and the magnetite being one or more magnetizable particles greater than one mm in diameter. In one embodiment, the magnetizable concrete where the base concrete contains 10% to 75% by volume of ferrite.

In another embodiment, the sub-base, base 60, and pillar 440 (70 in FIG. 3) can be made from one contiguous structure. A single contiguous structure can be more durable than distinct concrete components. In one example, the base 60, pillar 440, and inductive coil are embedded in a solid concrete pad unit. The solid concrete pad unit can provide an upper concrete layer having a surface thickness above the inductive coil from a range of 1.5 centimeters (cm) to 10 cm. The upper concrete layer above the inductive coil can typically be free of magnetizable particles (e.g. standard concrete).

Suitable concrete matrix material can include, but is not limited to, Portland cement concrete, and the like. Properties of concrete can be varied through adjustment of filler materials, aggregate, additives, and processing conditions. For example, dual filler ratio (cement vs. sand aggregate vs. magnetic aggregate), hydration processing, curing time, porous structure, changing material humidity, filler shapes, filler angularity, etc can all affect final concrete properties, as well as workability of uncured and poured concrete.

In one embodiment, the magnetic particles 420 can be ferrites, magnetite, or the like. Ferrites can include any number of magnetic iron oxide ceramic materials which include supplemental metallic elements (e.g. manganese, nickel, barium, zinc, etc). In one example, magnetic particles 420 can be manganese-zinc ferrite. As one example, the magnetic particles 420 can be some other soft ferromagnetic material. Soft ferromagnetic materials tend to have high permeability and but very small coercivity (e.g. less than 100 Oe and often less than 10 Oe), such that these materials also have very narrow hysteresis loops. In one embodiment, the first and second magnetic particles 420 can have a high aspect ratio from 2:1 to 100:1, and in some cases up to 20:1. In another embodiment the first and second magnetic particles 420 are ferrite in the form of oblate shaped or prolate shaped particles.

Furthermore, magnetic particles 420 can generally have an asymmetric shape (e.g. non-spherical). In some examples, the magnetic particles can have an aspect ratio of greater than about 1.2, in some cases greater than 2, and in other cases up to 20. In other embodiments, the ferrite is in the form of oblate-shaped flakes or prolate-shaped particles (e.g. rod-shaped). Ferrite in the form of oblate-shaped flakes can provide greater magnetic permeability than ferrite powder or rod-shaped ferrite particles. Similarly, magnetic particles 420 can vary in size but are generally greater than about 1 mm, and in some cases greater than 3 mm. In some examples, the first magnetic particles can be from 1 to 20 mm in length.

As one example, the power transfer pad can be integrated as part of a wireless power transfer system which can be used to recharge electric vehicles which are either parked above a pad or pass over during transit. Such a system can include an AC power source which is converted to DC power via a rectifier. A full-bridge inverter with phase shift control can be used to generate a high frequency voltage from the DC power. A compensation tank can then be used to deliver sinusoidal current to the power transfer pad. The magnitude and frequency of current delivered to the inductive coil (i.e. primary or transmitter coil) of the power transfer pad can be varied by control of the inverter shift angle, for example. For vehicles in motion, it can be desirable to energize the inductive coil as the vehicle and corresponding receiver coil on the vehicle pass over, and then terminate current and production of a magnetic field when the vehicle has passed. For example, sensors can be used to determine when a vehicle is approaching and/or located above the inductive coil. These sensors can be operatively connected to the power source and/or a control circuit which can be operated to energize the inductive coil intermittently as needed.

Figure 5:
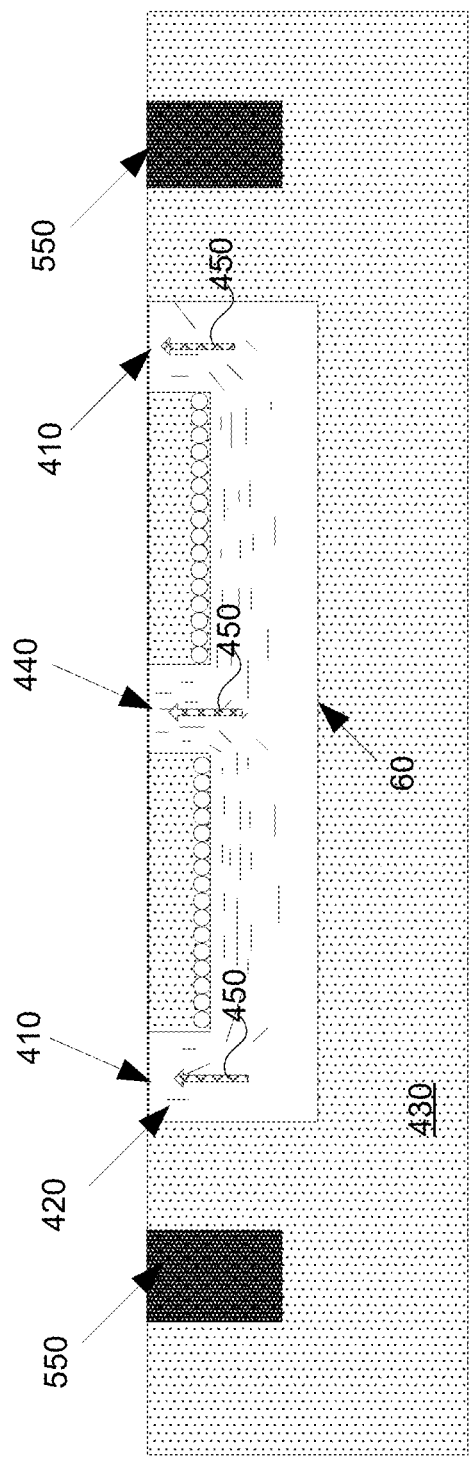
FIG. 5 is an illustration of a pad structure with a non-uniform concentration of magnetizable material and composite shielding structure along lateral edges, in accordance with an example.

FIG. 5 illustrates a pad structure with a non-uniform concentration of magnetizable material 420 and additional shielding blocks 550 of composite, in an example of which is similar in many respects to those described above, and which descriptions are hereby incorporated by reference. As in FIG. 4, a higher concentration of magnetic particles 420 can provide greater magnetic permeability. A non-uniform distribution of magnetic particles 420 can provide higher magnetic permeability where it is needed most, in this case closest to the pad coil. In another embodiment, the sub-base, base 60, and pillar 440 can be made from one contiguous structure. A single contiguous structure can be more durable than distinct concrete components.

Figure 6:
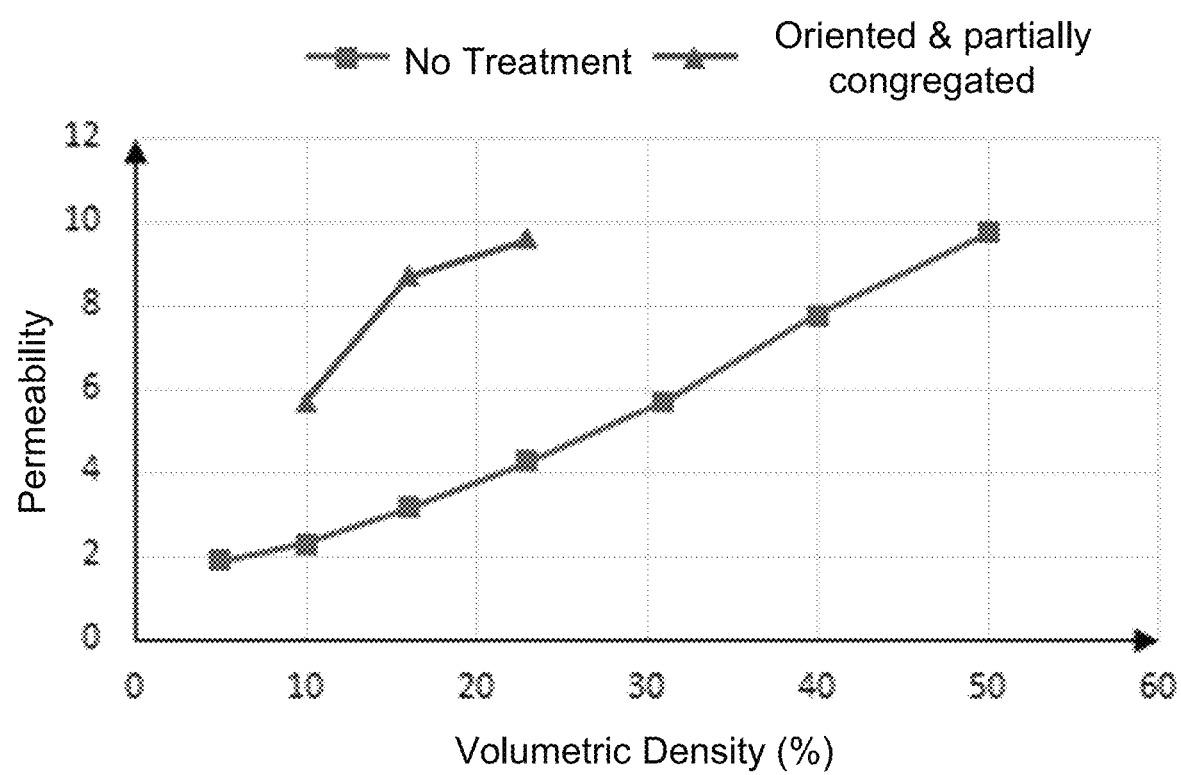
FIG. 6 is a graph of permeability as a function of volumetric density of crushed non-oriented and non-segregated ferrite in comparison with oriented and segregated ferrite rods.

As illustrated in FIG. 6, the pad structure can be made of ferrite composite with a variable volumetric density, $V_f$, and oriented ferrite particles inside the concrete host. The ferrite volumetric density is higher closer to the surface of the road and closer to the coil itself. The particles can also be oriented so that they generally follow the field lines during the wireless power transfer process. This structure allows stronger field shaping and higher mutual inductance with less ferrite material. In one example, a treated composite (i.e. variable concentration and oriented particles) of $V_f=16\%$ provided the same equivalent magnetic permeability as an untreated composite material (same crushed ferrite and concrete composition with no concentration gradient or particle orientation) having a Vf=44%. This resulted in a 63% reduction of magnetic particle material used to achieve the same performance.

As illustrated in FIG. 5, the pad structure with additional field shielding blocks 550 of composite can be located at both sides of the central power transfer section, located in the pillar 440. The side blocks 550 can be made of mixture of magnetite and optionally steel fibers in a concrete host. Magnetite can be used due to its low cost and higher losses than ferrite. Constructing the side shielding blocks with magnetite allows for the ability to attract stray magnetic field. Due to its high power loss density, it can convert the portion of the stray magnetic energy into an internal loss. Eddy currents induced inside the steel fiber can create a secondary field that reduces the actual stray (leakage) field. To obtain better performances of shielding, both magnetite and steel fibers can be introduced with a uniform direction distribution (or, in other words, oriented equally in all possible directions).

Figure 7:
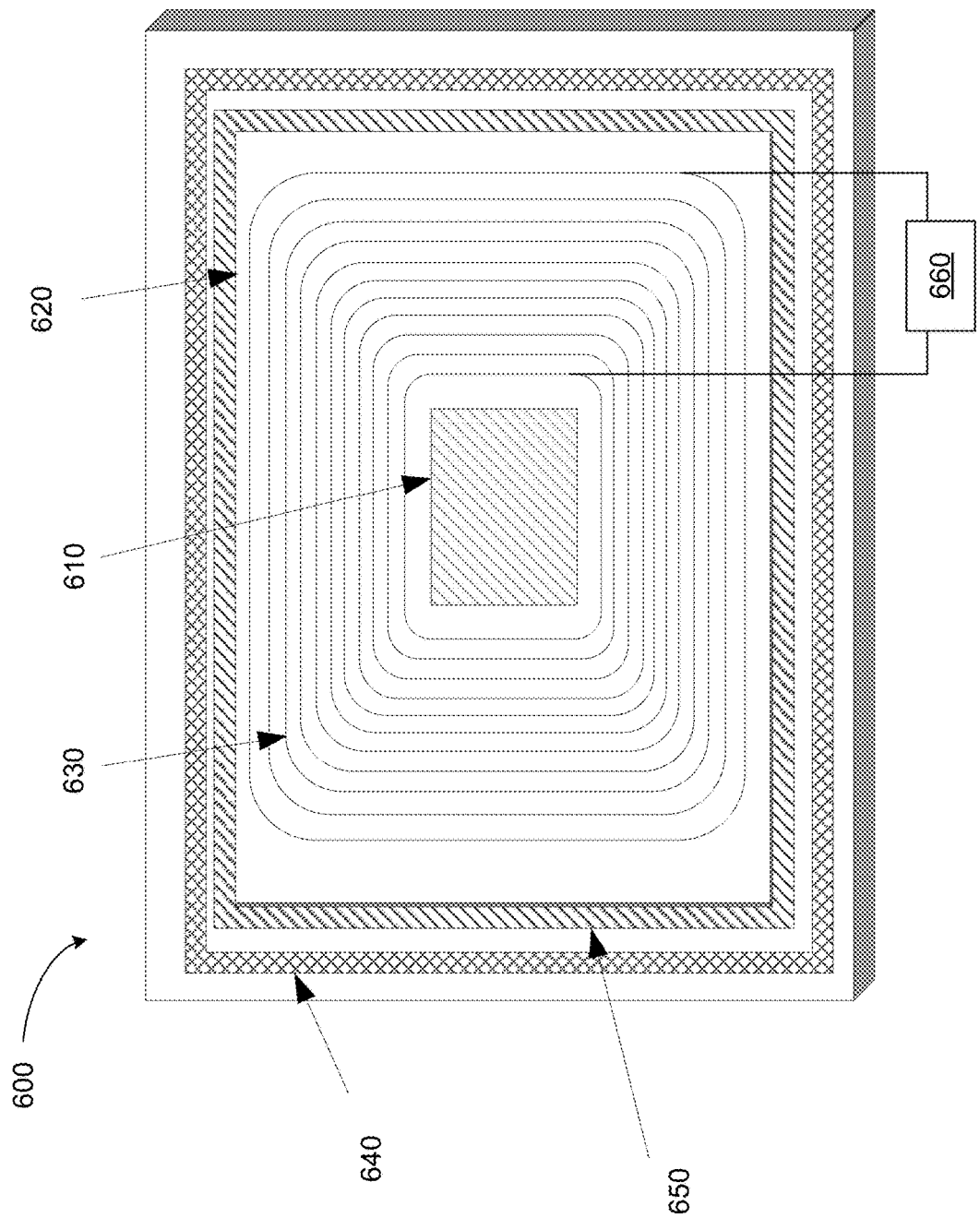
FIG. 7 is an illustration of a top view of a magnetizable concrete wireless power transfer pad, in accordance with an example.

FIG. 7 illustrates a top view of a magnetizable concrete wireless power transfer pad 600, in an example of which is similar in many respects to those described above, and which descriptions are hereby incorporated by reference. This view is provided for additional clarity in the overall configuration of each of the elements discussed previously. In some embodiments, a magnetizable concrete wireless power transfer pad comprises a base and subbase (not shown), an inductive coil 630, a centralized pillar 610, a shielding 640, and a secondary shaping magnetizable concrete 650. The shielding 640 can be a magnetic composite material, constructed to reduce the stray magnetic field outside the perimeter of the pad. The shielding 640 can be made out of a material such as magnetite, steel, or another magnetic property, suitable for shielding. The inductive coil 630 can be electrically connected to a high-frequency AC power source 660 typically with power control circuits as described herein.

In another embodiment, magnetizable concrete elements can be oriented adjacent an induction coil. These magnetizable concrete elements can comprise a concrete and magnetic particles dispersed therein as discussed herein. Concrete without magnetic particles can then be poured to encapsulate this assembly. Such an assembly can improve durability since the magnetic particle impregnated concrete elements and surrounding concrete can have reduced thermal expansion coefficient mismatch as compared to solid ferrite elements.

Although wireless charging of electronic devices such as vehicles can be particularly suitable to these systems, other applications can also benefit from the technology described herein. Non-limiting examples of suitable applications can include antenna radomes, antenna reflectors, antenna isolation barriers, or other waveform detectors.

Often, multiple wireless power transfer pads can be spatially distributed along a road surface. In some cases, multiple wireless power transfer pads can be oriented in series along a road path. Typically, such configurations can form a single row of pads. A problem appears when one pad is energized and is also magnetically coupled with an adjacent pad. In that case, it may cause very high undesired current in the adjacent coil. This undesirable result can be prevented or reduced by either: i) pads are spatially separated sufficient so that there is no coupling between them; or ii) pads are carefully overlapped so that their mutual coupling is again eliminated. One drawback of the first approach is that it provides intermittent power transfer, while the disadvantage of the second method is construction complexity. Thus, either approach can be chosen based on a balance of performance and cost. Although adjacent pads can be segmented as distinct structures which are placed or formed adjacent one another, in some cases, adjacent induction coils can partially overlap along adjacent edges. In this manner, field strength above the pads can be maintained while also minimizing losses. In such cases, corresponding concrete and magnetizable concrete can be shared along such edges (e.g. formed simultaneously and integrally with one another as described in more detail herein).

Figure 8:
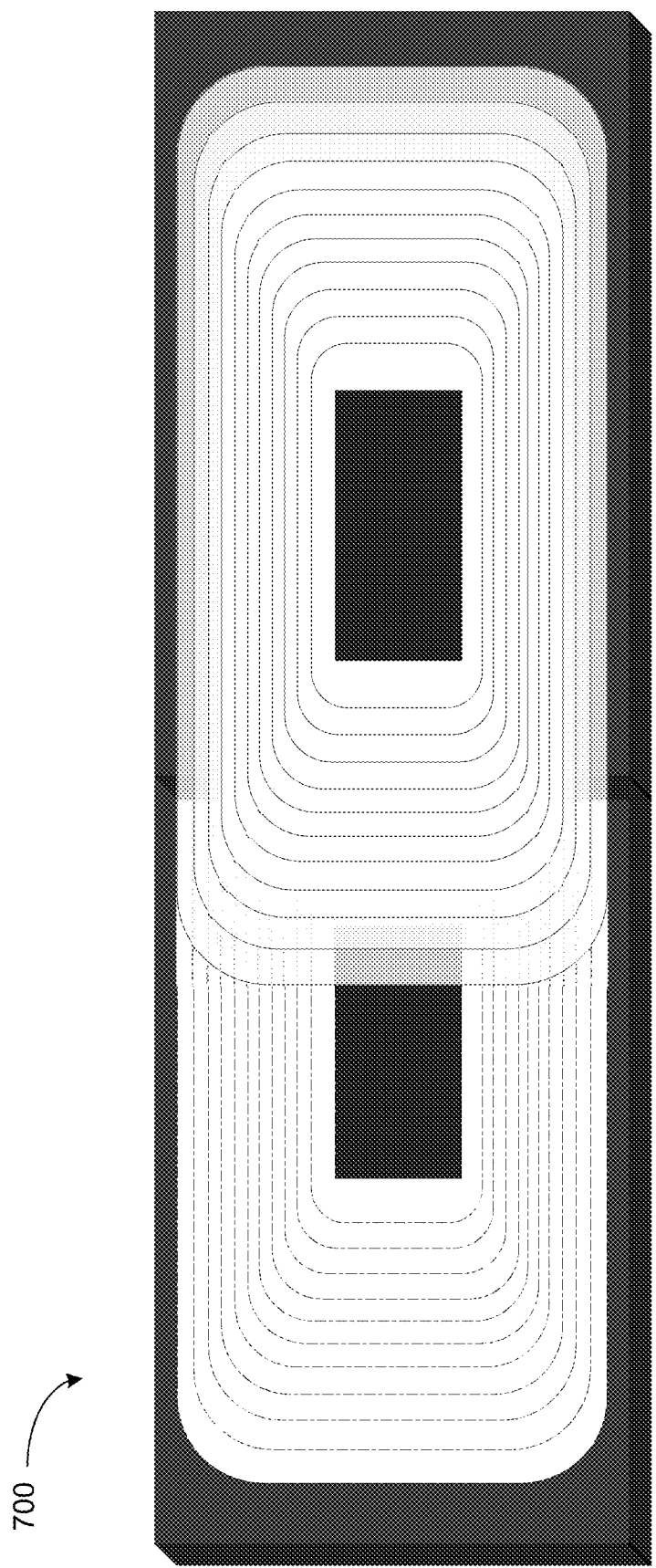
FIG. 8 is an illustration of an integrated magnetizable concrete wireless power transfer pad structure having multiple coil portions, in accordance with an example.

FIG. 8 illustrates a top view of an integrated multiple magnetizable concrete wireless power transfer pad structure similar to FIG. 7, in an example of which is similar in many respects to those described above, and which descriptions are hereby incorporated by reference. FIG. 8 illustrates FIG. 7 with multiple transfer pads integrated into one system 700. A structure such as this can be implemented in a stretch of space, road, sidewalk or an area where multiple power transfer pads are utilized to maintain a consistent, power transfer for predefined length and/or width. In one embodiment, the system can comprise of multiple transfer pads where the pads are separated by a predefined amount, with enough space to still allow a consistent power transfer to each transfer pad. In another embodiment, in a multiple transfer pad system, a front side of a first transfer pad can be constructed to overlap a back side of a second transfer pad. Multiple transfer pads can be implemented utilizing this method until a predefined length is met. In one embodiment, each transfer pad can be communicatively or electrically coupled in parallel, in series, or other mechanisms that will allow for a consistent, and continuous power transfer during passage of a corresponding receiving coil.

Figure 9:
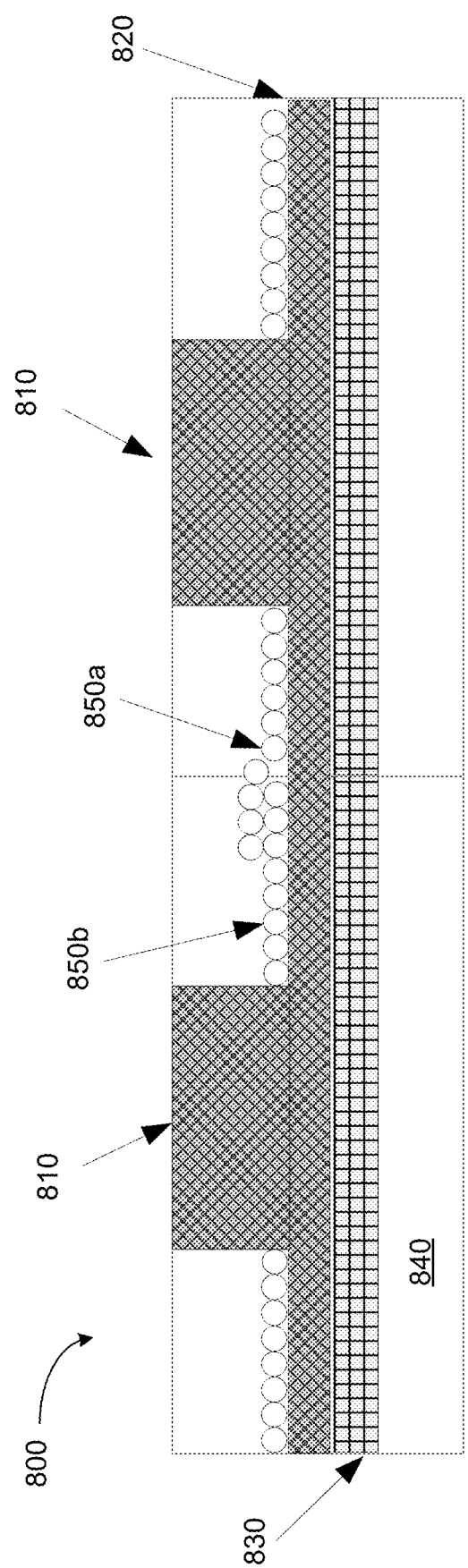
FIG. 9 is an illustration of a cross sectional view of an integrated magnetizable concrete wireless power transfer pad structure having multiple adjacent and overlapping coils, in accordance with an example.

FIG. 9 is an illustration of a side cross sectional view of an integrated multiple magnetizable concrete wireless power transfer pad structure 800, in an example of which is similar in many respects to those described above, and which descriptions are hereby incorporated by reference. In one embodiment, a concrete wireless power transfer pad includes a sub-base 830, a base 820 positioned directly above the sub-base 830, two inductive coils 850a, 850b positioned directly above and centered over the base 820 and a magnetizable concrete surrounding the pad structure 840. The magnetizable concrete wireless power transfer pad also includes a pillar 810 extending up from the base 820. The illustration of FIG. 9 further provides for an integrated two transfer pad system similarly described in FIG. 8, where the inductive coils of a first transfer pad, are communicatively and inductively coupled through an overlapping of the inductive coils of a second transfer pad. The position of each turn in the overlapping zone can be carefully designed to eliminate the coupling between adjacent power transfer pads. The overlapping of the coils of a first transfer pad and a second transfer pad allow for a consistent and sagless power transfer from power transfer pads in the road and the receiver pad attached to the vehicle. In some embodiments, there can be multiple transfer pads for a predefined length, interconnected or communicatively coupled through the described overlapping configuration. In some embodiments, the overlapping configuration described can be implemented in a section of road that stretched for several feet, yards, meters, miles or kilometers in order to create a consistent transfer of power to the vehicle moving over the pads. Thus, multiple coils can be individually or collectively controlled and can include as many coil and segments as desired (e.g. dozens, hundreds, thousands, or more). The power transfer can be configured to transfer power to a vehicle while moving or in a stationary position.

Figure 10:
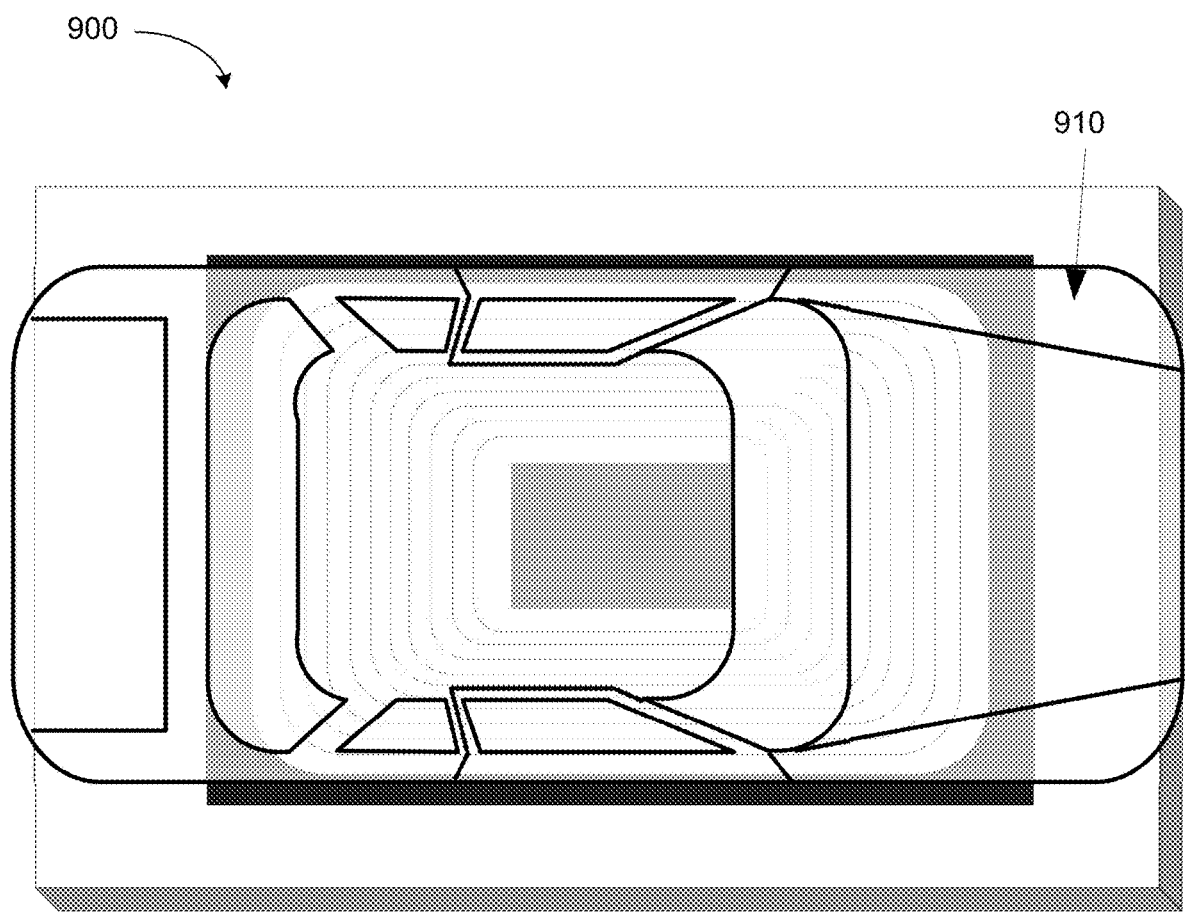
FIG. 10 is an illustration of a top view of a magnetizable concrete wireless power transfer pad with a vehicle in a charging position, in accordance with an example.

FIG. 10 illustrates a top view of a magnetizable concrete wireless power transfer pad 900, with a vehicle 910 in a charging position, in an example of which is similar in many respects to those described above, and which descriptions are hereby incorporated by reference. A transfer pad can be incorporated into a roadway or vehicle passage way, where when a vehicle 910 passes over the transfer pad, the transfer pad is able to charge the vehicle 910. In some embodiments, the vehicle can pass over multiple transfer pads communicatively coupled similarly to the illustrated and described embodiments in FIG. 8 and FIG. 9. In case of multiple overlapped pads in the direction of motion, as the vehicle is moving, the next pad is activated to transfer the power to the vehicle. The activation and deactivation process is controlled electronically and the whole process of energizing and deenergizing coils takes less than 5 ms. While the vehicle is above the overlapping zone between two pads, both coils are energized simultaneously for a short period of time to provide sagless power delivery to the vehicle, after which the one behind turns off and the following one takes the full power transfer.

Figure 11:
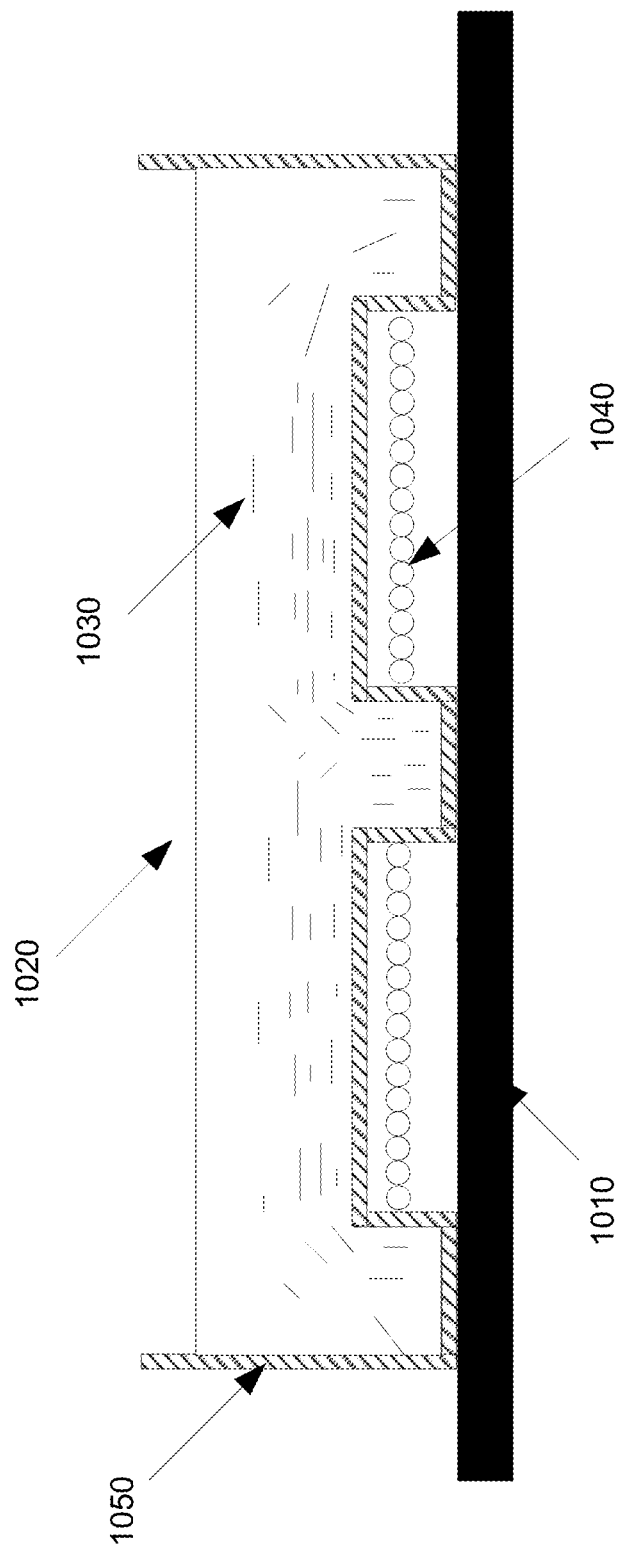
FIG. 11 is an illustration of a mold used to form a non-uniform distribution and orientation of magnetic particles, in accordance with an example.

FIG. 11 illustrates a method for non-uniform distribution and orientation of magnetic particles, in an example of which is similar in many respects to those described above, and which descriptions are hereby incorporated by reference. In one embodiment, a vibration table 1010, can vibrate a magnetizable concrete shaping portion 1020 constructed with magnetic particles 1030 prior to curing of the concrete allowing magnetic particles to segregate and create a non-uniform particle distribution inside shaping portion 1020. During the vibration, a strong DC+AC current will be sent through the coil to create a strong magnetic field in shaping portion 1020. That field is responsible for orientation of the magnetic particles, since the particles will tend to align themselves with the field lines. The vibration and coil current of the magnetizable concrete shaping portion 1020 is configured to orient the magnetic particles 1030 to maximize the hosted magnetic field, and provide higher magnetic permeability where it is needed most, by causing a higher concentration of particles to congregate closer to the inductive coils 1040. The inductive coils can contain coils able to withhold high current in direct current (DC), alternating current (AC) or a combination thereof (DC+AC). The vibration of the magnetizable concrete shaping portion 1020, can be achieved by pouring the transfer pad 1020 into a wooden or metal mold container 1050. For example, concrete can be prepared and mixed with a desired concentration of magnetic field shaping particles. During vibration, the particles can be distributed throughout the magnetizable portion of the transfer pad. Additional preferential orientation and concentration gradient can be formed by applying a voltage to the inductive coils prior to curing of the concrete. Upon curing, the magnetizable shaping portion can then be laid into place along with a corresponding inductive coil. Concrete (without magnetizable particles) can then be poured around the inductive coil and shaping portion to form a final wireless power transfer pad as described above.

Figure 12:
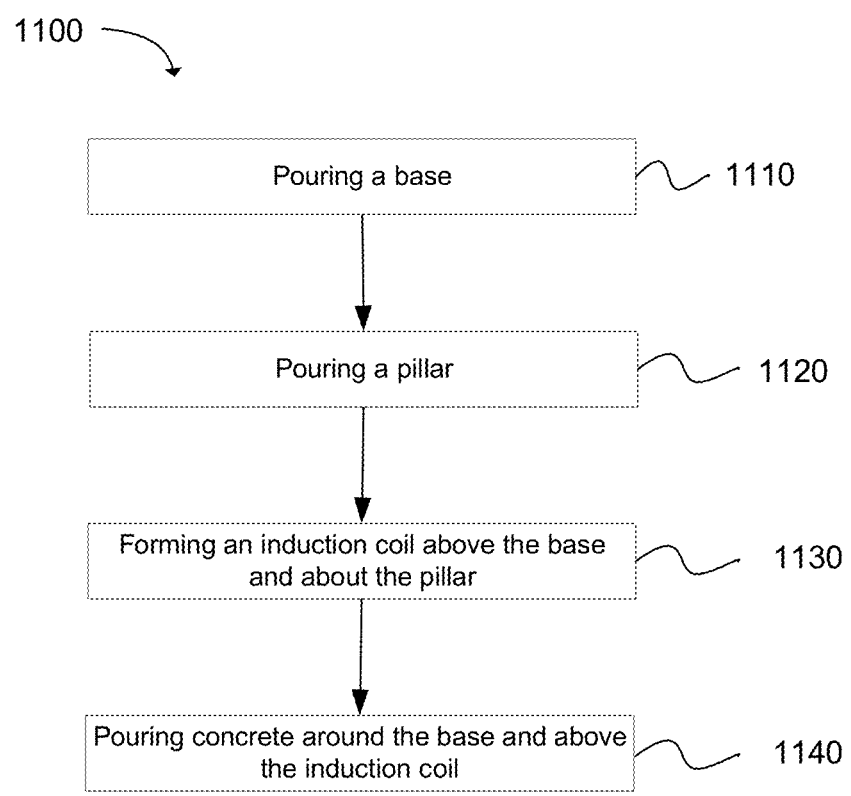
FIG. 12 is a flow chart illustrating a method of forming the wireless power transfer pads, in accordance with the example presented in FIG. 1.

Other embodiments of the present disclosure include methods 1100 for making a magnetizable concrete wireless power transfer pad as outlined in FIG. 12. A method 1100 for making a magnetizable concrete wireless power transfer pad includes pouring a base comprising a magnetizable base concrete including concrete and first magnetizable particles 1110. The first magnetizable particles can have a magnetic permeability and a magnetic saturation 1110. The method can further include pouring a pillar extending up from and centered over the base within an inductive coil gap region and having a width smaller than a width of the base 1120. The pillar can comprise a magnetizable pillar concrete including concrete and second magnetizable particles. The second magnetizable particles can have a magnetic permeability and a magnetic saturation such that the base and the pillar collectively shape an external magnetic field produced by the inductive coil. The method can further include positioning an inductive coil adjacent and centered over the base, the inductive coil forming the inductive coil gap at its center inner perimeter between a conductive wire that form the inductive coil 1130. The inductive coil further can have an outer perimeter, a lateral width, and a longitudinal length. Standard concrete can then be poured to fill in above the induction coil, and about the base as generally illustrated in FIGS. 1-5.

In one embodiment the method can further comprise pouring a subbase oriented adjacent the base opposite the base opposite the pillar. In one embodiment, the base can be planar and extend beyond the outer perimeter. In one embodiment, the method can further comprise pouring a secondary shaping pillar extending up from the base along at least a lateral perimeter of the inductive coil, the secondary shaping pillar comprising a second magnetizable pillar concrete. In one embodiment, the first and second magnetic particles can have a high aspect ratio from 2:1 to 100:1. In one embodiment, the first and second magnetic particles are ferrite in the form of oblate-shaped or prolate-shaped particles. In one embodiment, the first magnetic particles can be configured to be 1 to 20 millimeters (mm) in length. In one embodiment, the first magnetic particles in the magnetizable base concrete can have a non-uniform distribution with the highest concentration of magnetic particles being closest to a surface facing the inductive coil. In one embodiment, the second magnetic particles in the magnetizable pillar concrete can have a non-uniform distribution with the highest concentration of magnetic particles being closest to surfaces facing the inductive coil.

In other embodiments, the sub-base, base, and pillar are poured as one contiguous structure. Although not required, the entire assembly can then be encapsulated within a concrete block suitable for placement within a road base or other suitable location. Such concrete block can be formed of matrix concrete without magnetic particles embedded therein.

Furthermore, it can be beneficial to reinforce magnetic orientations of magnetic particles in a common direction. As a general guideline, mere mixing of magnetic particles will not result in particularly uniform alignment of magnetic particles although self-alignment can occur to a modestly significant degree. In some cases, native magnetic particle orientation can be less than about 85%, and most often less than 70%. In order to further increase uniformity of particle magnetic orientation, additional processing steps can be introduced. For example, an external magnetic field can be applied to further align particles prior to curing of the concrete. In another optional aspect, vibration of a mixture of particles in the magnetizable concrete (prior to curing) can be performed, optionally while under the external magnetic field. Such vibration can further improve uniformity of magnetic particle alignment. Vibration parameters can include, but are not limited to, amplitude, frequency, and direction. Vibration movement can occur in a direction parallel, substantially parallel, transverse but not orthogonal, or orthogonal to a desired alignment direction. In some cases, depending on materials, alignment can be greater than 85% aligned, and in other cases greater than 90% aligned (e.g. 0.85 and 0.90 orientation index). In some cases, magnetic permeability can be increase from 1.5 to 3 times depending on the materials. Thus, such increases in uniformity of alignment can enhance magnetic properties such as, but not limited to, magnetic permeability.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

The present invention may be embodied in other specific forms without departing from its spirit or essential characteristics. The described embodiments are to be considered in all respects only as illustrative, and not restrictive. All changes which come within the meaning and range of equivalency of the foregoing description are to be embraced within the scope of the invention.

What is claimed is:

1. A magnetizable concrete wireless power transfer pad, comprising:
    a base comprising a magnetizable base concrete including concrete and first magnetizable particles, the first magnetizable particles having a magnetic permeability and a magnetic saturation;
    an inductive coil positioned directly adjacent and centered over the base, the inductive coil forming an inductive coil gap at its center inner perimeter between a conductive wire that form the inductive coil, the inductive coil having an outer perimeter, a lateral width, and a longitudinal length; and
    a pillar extending up from the base through the inductive coil gap, the pillar comprising a magnetizable pillar concrete including concrete and second magnetizable particles, the second magnetizable particles having a magnetic permeability and a magnetic saturation such that the base and the pillar collectively shape an external magnetic field produced by the inductive coil to reduce power and to increase inductance.

2. The magnetizable concrete wireless power transfer pad of claim 1, wherein the base is planar and extends beyond the outer perimeter.

3. The magnetizable concrete wireless power transfer pad of claim 2, further comprising a secondary shaping pillar extending up from the base along at least a lateral perimeter of the inductive coil, the secondary shaping pillar comprising a second magnetizable pillar concrete.

4. The magnetizable concrete wireless power transfer pad of claim 3, wherein the first and second magnetic particles have a high aspect ratio from 2:1 to 100:1.

5. The magnetizable concrete wireless power transfer pad of claim 1, wherein the first and second magnetic particles are ferrite in the form of oblate-shaped or prolate-shaped particles.

6. The magnetizable concrete wireless power transfer pad of claim 3, wherein the first magnetic particles are from 1 to 20 mm in length.

7. The magnetizable concrete wireless power transfer pad of claim 3, wherein the first and second magnetizable particles are ferrite.

8. The magnetizable concrete wireless power transfer pad of claim 3, wherein the magnetizable base concrete containing 10% to 75% by volume of the first magnetizable particles.

9. The magnetizable concrete wireless power transfer pad of claim 1, wherein the first magnetic particles in the magnetizable base concrete has a non-uniform distribution with a highest concentration of magnetic particles being closest to a surface facing the inductive coil and closest to an upper road surface and the second magnetic particles in the magnetizable pillar concrete has a non-uniform distribution with a highest concentration of magnetic particles being closest to surfaces facing the inductive coil.

10. The magnetizable concrete wireless power transfer pad of claim 9, wherein the first and second magnetic particles are oriented along magnetic field lines of the inductive coil.

11. The magnetizable concrete wireless power transfer pad of claim 1, further comprising a sub-base oriented adjacent the base opposite the pillar, wherein the sub-base comprises magnetizable concrete containing between 10% and 75% by volume magnetite and the magnetite being particles greater than one mm in diameter.

12. The magnetizable concrete wireless power transfer pad of claim 1, wherein the base and pillar are one contiguous structure.

13. The magnetizable concrete wireless power transfer pad of claim 1, wherein the base, pillar, and inductive coil are embedded in a solid concrete pad support unit formed of a concrete substantially free of magnetizable particles.

14. The magnetizable concrete wireless power transfer pad of claim 13, wherein the solid concrete pad support unit provides an upper concrete layer having a surface thickness above the inductive coil from 1.5 cm to 10 cm.

15. The magnetizable concrete wireless power transfer pad of claim 1, further comprising a shielding element positioned around at least a portion of a lateral perimeter of the sub-base wherein the shielding comprises a concrete and third magnetizable particles so as to reduce or eliminate the external magnetic field beyond an outer edge of the shielding element, the third magnetizable particles having a magnetic permeability lower than the first and the second magnetizable particles, and an electric conductivity higher than the first and the second magnetizable particles.

16. The magnetizable concrete wireless power transfer pad of claim 15, wherein the third magnetizable particles comprise magnetite.

17. A method for making a magnetizable concrete wireless power transfer pad, the method comprising:
    pouring a base comprising a magnetizable base concrete including concrete and first magnetizable particles, the first magnetizable particles having a magnetic permeability and a magnetic saturation;
    pouring a pillar extending up from and centered over the base within an inductive coil gap and having a width smaller than a width of the base, the pillar comprising a magnetizable pillar concrete including concrete and second magnetizable particles, the second magnetizable particles having a magnetic permeability and a magnetic saturation such that the base and the pillar collectively shape an external magnetic field produced by an inductive coil to reduce power and to increase inductance;
    positioning the inductive coil adjacent and centered over the base, the inductive coil forming the inductive coil gap at its center inner perimeter between a conductive wire that form the inductive coil, the inductive coil having an outer perimeter, a lateral width, and a longitudinal length; and pouring a support concrete above the inductive coil to form an upper road surface and optionally below and surrounding the base.

18. The method of claim 17, further comprising pouring a subbase oriented adjacent the base opposite the pillar.

19. The method of claim 17, where the base is planar and extends beyond the outer perimeter.

20. The method of claim 17, further comprising pouring a secondary shaping pillar extending up from the base along at least a lateral perimeter of the inductive coil, the secondary shaping pillar comprising a second magnetizable pillar concrete.

21. The method of claim 17, wherein the first and second magnetic particles have a high aspect ratio from 2:1 to 100:1, wherein the first and second magnetic particles are ferrite in the form of oblate-shaped or prolate-shaped particles, wherein the first magnetic particles are from 1 to 20 mm in length, and wherein the magnetizable base concrete and the magnetizable pillar concrete contain 10% to 75% by volume of the first magnetizable particles and second magnetizable particles respectively.

22. The method of claim 17, wherein the first magnetic particles in the magnetizable base concrete and the magnetizable pillar concrete have a non-uniform distribution with a highest concentration of magnetic particles being closest to a surface facing the inductive coil and an upper road surface.

23. The method of claim 17, wherein the base, and pillar are poured as one contiguous structure.

24. The method of claim 17, further comprising increasing a magnetic orientation uniformity of the magnetic particles by subjecting the magnetizable concrete to vibration and an external magnetic field prior to curing of the magnetizable concrete, wherein the vibration and external magnetic field orient the first and second magnetic particles along magnetic field lines of the inductive coil.

25. The method of claim 17, further comprising a shielding element positioned around at least a portion of a lateral perimeter of the sub-base wherein the shielding comprises a concrete and third magnetizable particles so as to reduce or eliminate the external magnetic field beyond an outer edge of the shielding element, the third magnetizable particles having a magnetic permeability lower than the first and the second magnetizable particles, and an electric conductivity higher than the first and the second magnetizable particles.

* * * * *